INVENTORS
KENNETH W. GRAYBILL
HANS SENGEBUSCH
BY
ATTY.

Dec. 15, 1959     K. W. GRAYBILL ET AL     2,917,587
CROSSBAR SWITCH
Filed Nov. 15, 1955     7 Sheets-Sheet 2
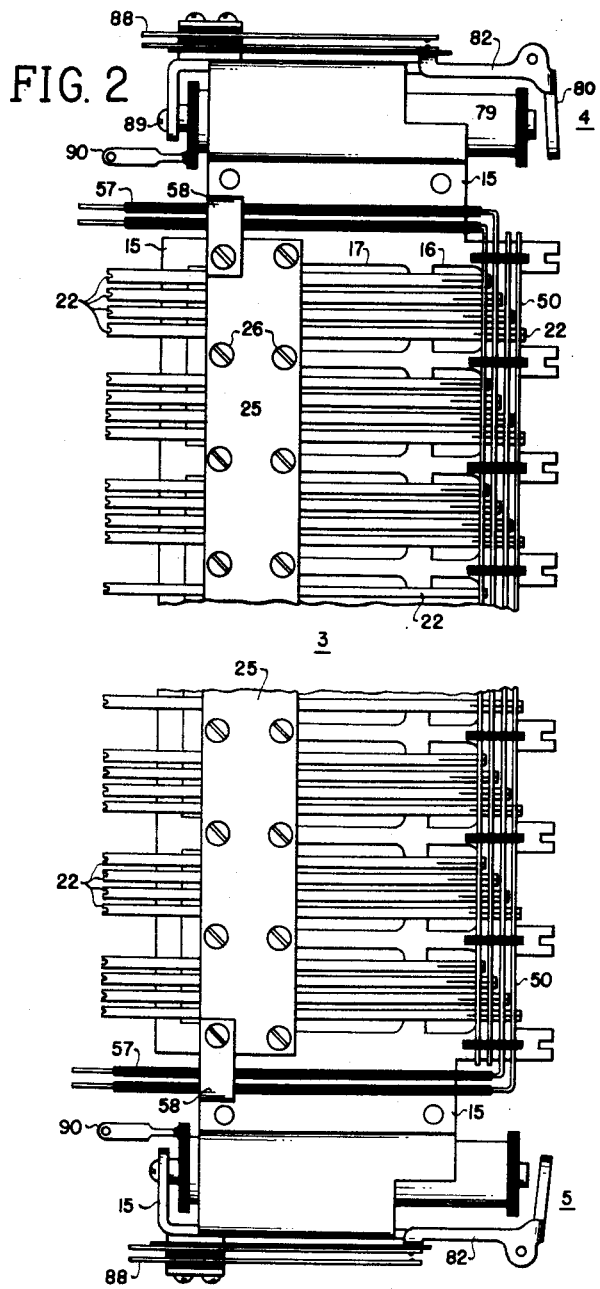
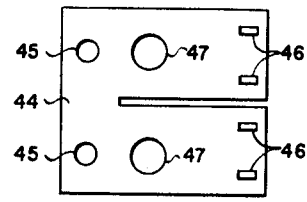
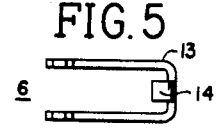
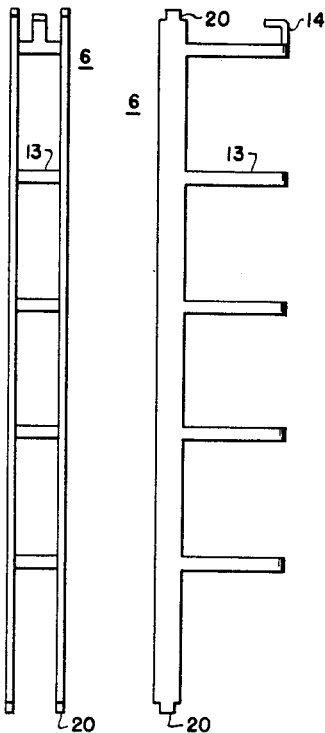
INVENTORS
KENNETH W. GRAYBILL
HANS SENGEBUSCH
BY
ATTY.

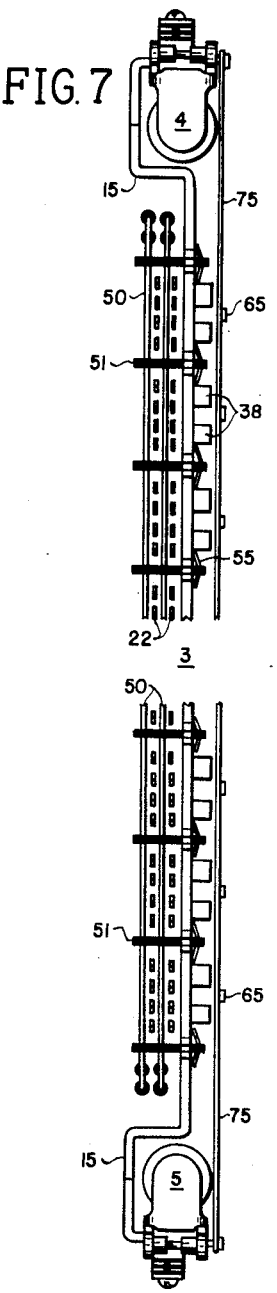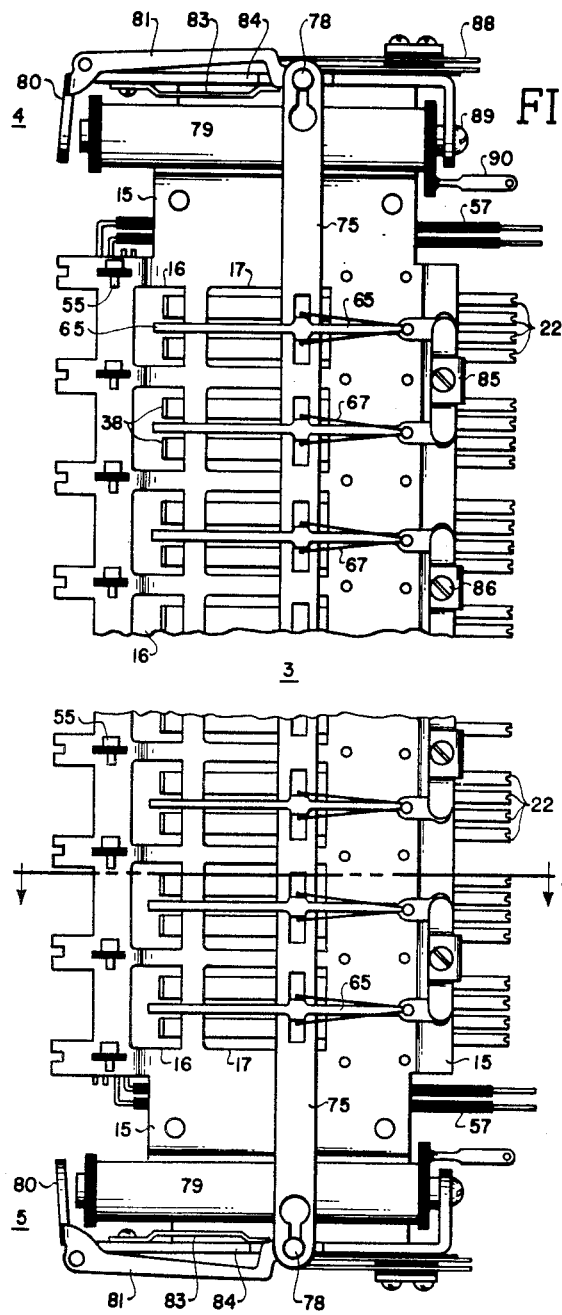

Dec. 15, 1959 K. W. GRAYBILL ET AL 2,917,587
CROSSBAR SWITCH
Filed Nov. 15, 1955 7 Sheets-Sheet 4
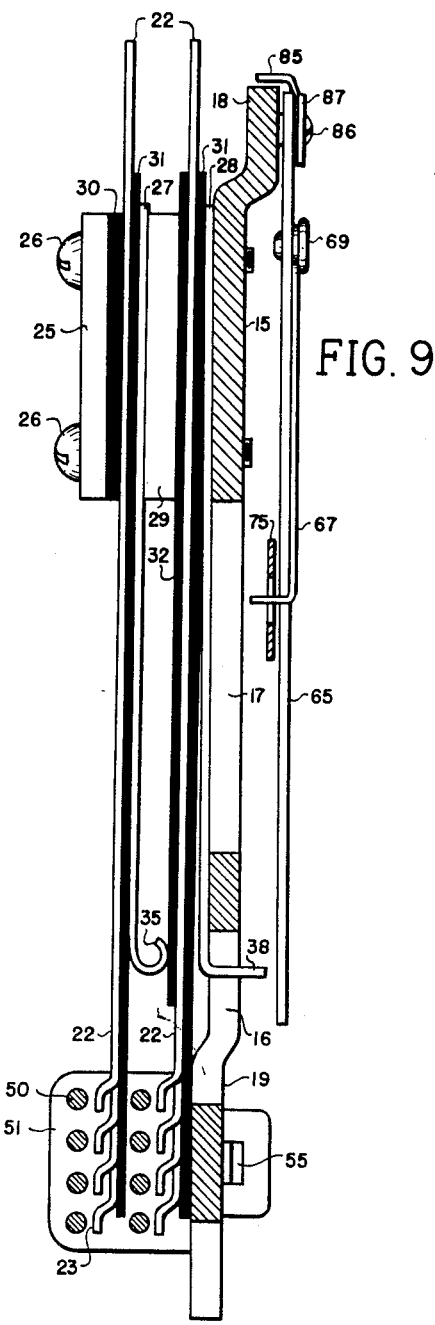
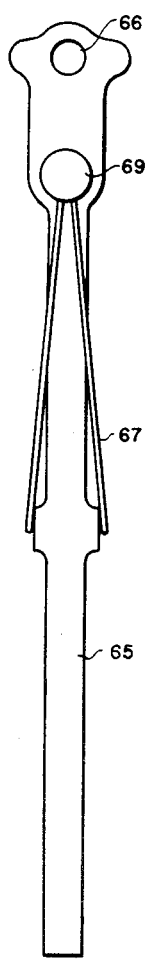
FIG. 10
FIG. 11
FIG. 14
FIG. 13
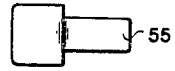
FIG. 12
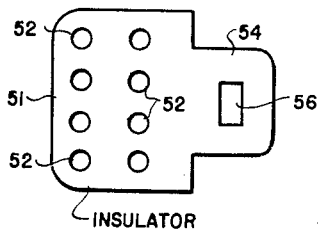
INVENTORS
KENNETH W. GRAYBILL
BY HANS SENGEBUSCH
ATTY.

Dec. 15, 1959 K. W. GRAYBILL ET AL 2,917,587
CROSSBAR SWITCH
Filed Nov. 15, 1955 7 Sheets-Sheet 5
FIG. 19
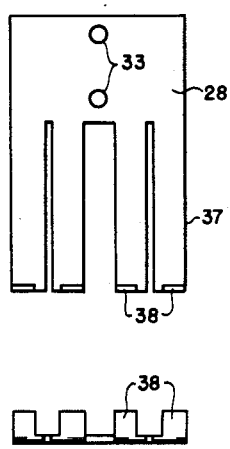
FIG. 16
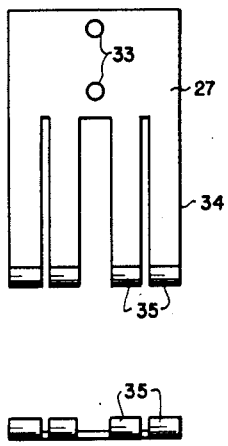
FIG. 15
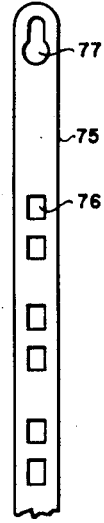
FIG. 20
FIG. 17
FIG. 21
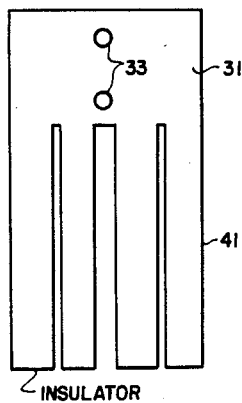
FIG. 18
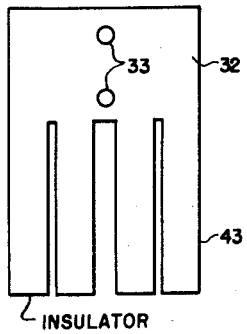
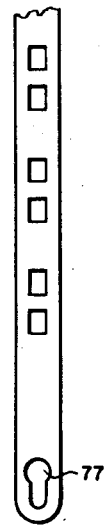
INVENTORS
KENNETH W. GRAYBILL
BY HANS SENGEBUSCH
ATTY.

Dec. 15, 1959   K. W. GRAYBILL ET AL   2,917,587
CROSSBAR SWITCH
Filed Nov. 15, 1955   7 Sheets-Sheet 7
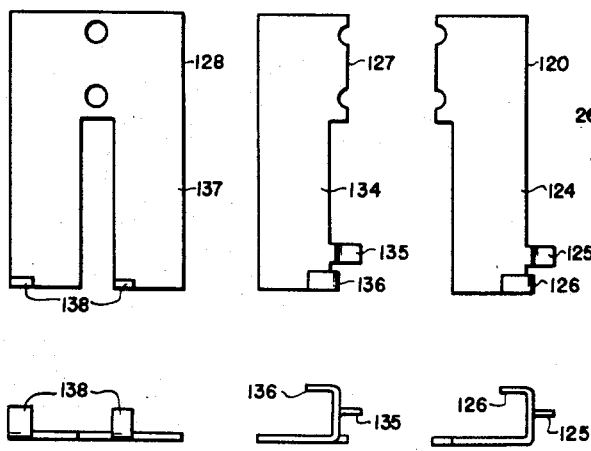
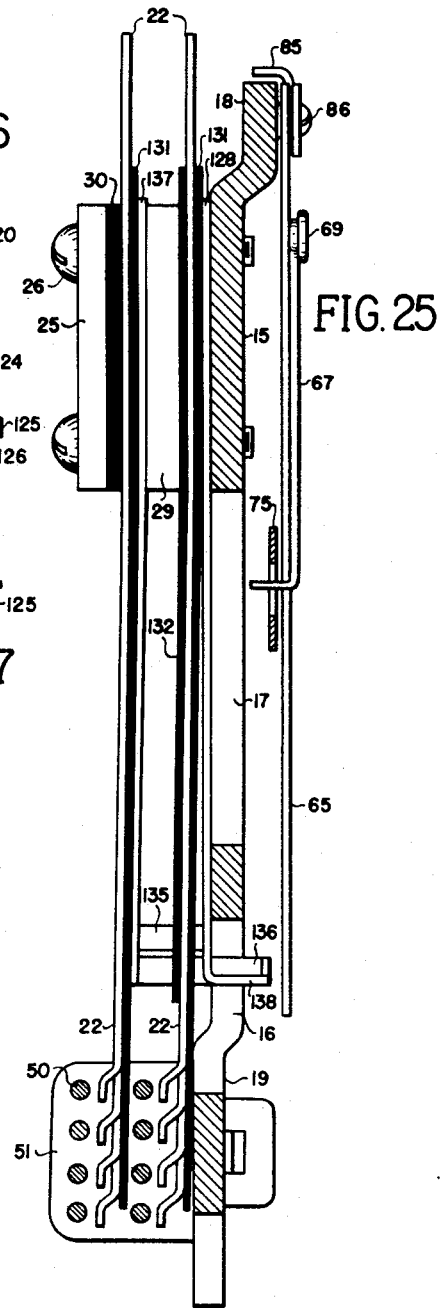
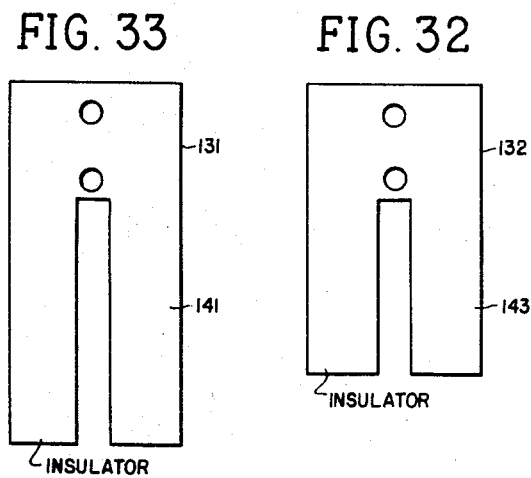
INVENTORS
KENNETH W. GRAYBILL
HANS SENGEBUSCH
BY
ATTY.

United States Patent Office 2,917,587
Patented Dec. 15, 1959

2,917,587
CROSSBAR SWITCH

Kenneth W. Graybill, Elmhurst, and Hans Sengebusch, Ingleside, Ill., assignors to General Telephone Laboratories, Incorporated, a corporation of Delaware Application November 15, 1955, Serial No. 546,967

21 Claims. (Cl. 179—27.54)

This invention relates to crossbar switches such as used in automatic telephone systems for extending connections between telephone subscribers.

The better known switches of this type, such as that shown in Patent 2,021,329 issued to J. N. Reynolds on November 19, 1935, consist primarily of individual pileups of three or four pairs of make contacts each, with the pileups aligned side by side in pairs on a plurality of contact panels mounted in parallel tiers one above the other. A plurality of rocking shafts, mounted across the front of the switch at right angles to said contact panels and between said pairs of pileups, are arranged to rotate select fingers from a central neutral position to right or left selecting positions below one or the other of the corresponding pairs of contact pileups on the different panels. A rocking armature is also mounted transversely below each contact panel at right angles to the select shafts, and adjacent to the tips of the select fingers. If any one of these armatures or "hold bars" is operated following a selective movement of one of the select shafts, it will lift the corresponding select finger, which in turn will operate the selected spring pileup on the associated contact plate. The select shaft is then restored to its normal position and returns the remaining select fingers to their neutral position, while the lifted select finger is held in place by the hold bar. Upon release of the hold bar, this select finger also resumes its normal, or neutral position. In the referred-to Reynolds patent, the select fingers were made of spring wire to provide the flexibility required for this action. Electromagnets at the ends and sides of the switch, controlled the operations of the select shafts and hold bars.

Systems using such switches are essentially all-relay systems, whose cost had been found to increase rapidly with size. The crossbar switch represents an attempt to reduce this cost, by making a small number of electromagnets do the work of many. Among advantages claimed for these switches are reduction in noise, and wear, and maintenance, due to the small travel distances of the moving parts. Among disadvantages are the bulk and weight of the individual switches, and the large number of parts required, some of which present problems of manufacture and assembly. Other disadvantages are inadequate visibility and accessibility of the contact springs and the various operating clearances. This is partly due to the necessity of mounting the contact pileups very close together, to avoid prohibitive space requirements.

It is an object of the present invention to provide a switch of this general class employing a relatively small number of low cost parts, simple to make and assemble, and so arranged as to occupy a minimum of space, without undue crowding of the contacts and other moving parts.

It is another object of the invention to provide improved visibility of essential operating clearances of the contacts and other moving parts, from the front of the switch.

A feature of the invention is the re-arrangement of the contacts of the different contact sets in two long rows parallel with the contact panels in a common assembly, rather than in separate pileups at right angles to said panel. This makes a flat assembly, and permits partial blanking of the springs from a common sheet in a comblike form, which can then be assembled as a unit, with the excess material at the terminal end to be clipped off after assembly.

Another feature of the invention is the separation of the fixed contacts from the movable contacts, with the latter mounted along the rear edge of the panel with the working tips pointing forward, and the fixed contacts mounted along the front edge of the panel, in the form of bare wire conductors common to the different spring sets of the same panel.

Another feature of the invention is the mounting of the select fingers, and the pivoting means therefor, on the contact plate, in planes parallel therewith, to form a unitary structure of minimal thickness.

A further feature is the provision of thin, flexible lift plates built into the movable spring pileup under the spring rows and arranged to operate a plurality of springs in each of the parallel rows, in response to a transverse movement of a pivoted select finger.

Another feature is the provision of a detachable, non-rocking hold bar, which occupies a minimum of space between the contact plates.

Other objects and features of the invention will be apparent from the following description and claims, based on the accompanying drawings, in which:

Fig. 2 is a side view of one of the contact panel units as seen from the contact side, with the center portion broken away.

Figs. 3, 4, 5 are front, side, and end views respectively, of one of the hold bars.

Fig. 6 shows one of the leaf spring mountings for the hold bars.

Fig. 7 is a front view of the contact panel unit of Fig. 2.

Fig. 8 is a side view of the contact panel unit of Fig. 2, as seen from the select finger side.

Fig. 9 is an enlarged cross-sectional view of Fig. 8, taken along the line A—A.

Fig. 10 is a plan view of the select finger shown in profile at the right of Fig. 9, drawn on the same scale.

Fig. 11 shows the enlarged spring link of Fig. 10 before assembly.

Fig. 12 shows the enlarged bare wire conductor mounting block and insulator, seen at the bottom of Fig. 9.

Figs. 13, 14 are plan and side views respectively of the leaf spring key or cotter used to secure the mounting block of Fig. 13 to the contact panel, drawn on the scale of Fig. 9.

Fig. 15 is a plan view, normal size, with the center broken away, of the selection control ribbon, which serves to link up and pivot the select fingers of a contact panel.

Figs. 16, 17 are normal size plan and end views respectively, of one of the outer contact actuating plates.

Fig. 18 shows an insulator plate for use with the actuating plate of Figs. 16, 17.

Figs. 19, 20 are plan and end views respectively, of one of the inner contact actuating plates.

Fig. 21 shows an insulator plate for use with the actuating plates of Fig. 16 and 19.

Fig. 25 is an enlarged view, corresponding to Fig. 9, of an alternative arrangement of the contact spring assembly.

Figs. 26, 27 and 28, 29 are plan and end views normal size, of two single outer lift plates to be used with the arrangement of Fig. 25, in place of the double outer lift plate of Fig. 9.

Figs. 30, 31 are plan and end views respectively, of a double inner lift plate for use with Fig. 25.

Fig. 32 shows a double insulating plate for use with the two single actuating plates of Figs. 26 to 29.

Fig. 33 shows a double insulating plate for use with the lift plates of Figs. 26 to 31.

Figure 1:
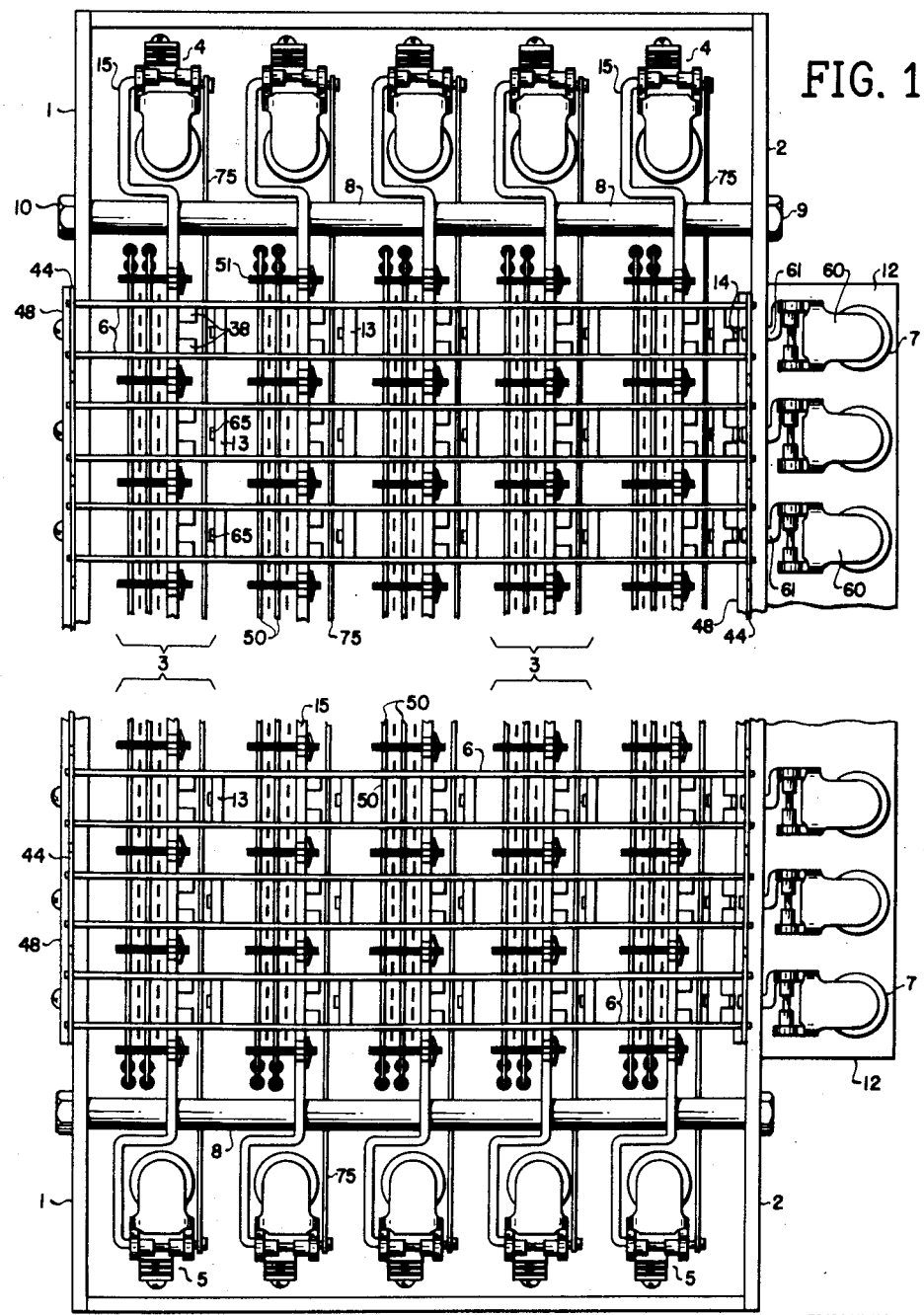
Fig. 1 is a front view of the switch, with the center portion broken away.

The complete switch, as shown in Fig. 1, consists essentially of a simple rectangular frame of sheet metal, having side walls 1 and 2, which serve as a mounting for five contact units 3 complete with their select magnets 4 and 5, and ten hold bars 6 together with their hold magnets 7. The contact units or contact panels are secured in parallel rows between the plates 1 and 2 by spacer posts 8 having a threaded extension at one end and a tapped hole at the other end, with the end spacer posts secured to the frame by bolts 9 and nuts 10. The hold magnets 7 are mounted on the side wall 2 on a right-angled rear extension 12 thereof, or in any other convenient manner. The hold bars 6 are independently suspended between the side walls, across the front of the switch, in a manner to be described later in more detail. Fig. 1 provides extra spacing between the contact units, to allow room for the insertion of designation numerals.

The contact unit 3, shown separately in Figs. 2, 7 and 8, is mounted on a long rectangular metal panel 15, with formed upper and lower ends which serve as a mounting for the select magnets 4 and 5. Two rows of rectangular openings 16 and 17 (Fig. 8) are cut in this panel to facilitate the transverse movement of the select finger, and to reduce the weight of the panel. Opposing setbacks or formed steps 18 and 19 (Fig. 9) are also provided at the front and rear edges, for mounting the fixed contacts and the select fingers at the proper perpendicular distances from the main body of the panel.

The movable contact springs 22, best seen in Figs. 2, 7 and 9, are flat twin-contact springs a little over three inches in length, with the contact end formed into a step 23 (Fig. 9), which is faced with silver or the like on the outer side. These springs are mounted on the panel 15 in two long rows or levels parallel with the panel, and a plurality of rows perpendicular to the panel. They are divided into ten groups of eight springs each, only a portion of which are shown in the drawings. Each group of eight is further divided into two sub-groups of four springs each, representing for example, line and control wires of a subscriber's line. These groups of four may consist of two springs in each level, or they may consist of four springs in a single level, as will be shown. The contact ends of the springs are aligned along the front edge of the panel, with the tips in each group set back from the edge in uniform successive steps, as shown in Figs. 2 and 9.

As also shown in Figs. 2 and 9, these springs are mounted along the rear edge of the contact panel on one side thereof, in a common pileup secured by common fastening means including the retaining plate 25 and screws 26. Also included in this pileup, as shown in Fig. 9, are contact lifting plates such as 27 and 28, a spacer plate 29, and insulators such as 30, 31 and 32. The metal spacer plate 29 and the insulator 30 have the same dimensions of length and width as the retaining plate 25, and are not otherwise illustrated.

The outer contact lifting plate 27, separately illustrated in Figs. 16 and 17, is made from sheet nickel silver or the equivalent, with two mounting holes 33 to allow passage of the screws 26. Each lifting plate is divided into four parallel tongues 34, each of which underlies two of the adjacent contact springs of the outer row. The ends of these tongues are formed or rolled under at the point 35 to provide a uniform spacing between the working ends of the two layers of contact springs. Since each part 27 serves eight springs, five such parts would be required for the forty springs of the row.

The inner contact lifting plate 28, illustrated separately in Figs. 19 and 20, is made of the same material as the outer lifting plate, and is otherwise identical except for the differently shaped tips 38 formed on the tongues 37. As shown in Fig. 9, these tips are turned down at right angles to the body of the lifting plate, and project through the openings 16 to the other side of the panel 15.

The insulating plates 31 and 32, shown separately in Figs. 21 and 18, serve to separate and insulate the contact springs from the lifting plates and the other parts of the assembly, including the mounting panel 15. The insulating plates 31, used underneath both rows of contact springs, are similar in outline to the lifting plates, but longer, since they underlie the full length of the contact springs, while the lifting plates do not. They are provided with corresponding mounting holes 33, and corresponding straight tongues 41. Because they are required to move with the lift plates, they are made of a flexible material such as "Bakelized" canvas. The insulating plate 32 is similar but shorter, being only slightly longer than the lifting plates.

From the form of the lift plates 27 and 28, and the insulating plates 31 and 32, and their arrangement side by side in common planes in a common assembly, it will be apparent that instead of being separately punched out as five identical parts, all five parts could be combined into a single part punched from a single piece of material in a comb-like arrangement having twenty tongues, and extending the length of the pileup. If each row of forty contact springs were likewise punched out as a unit, with the excess material at the terminal end to be clipped off after assembly, the number of separate parts to be assembled would be reduced drastically, with a corresponding saving in assembly time. In this case, the complete pileup, not counting the screws, would consist of only ten parts: (1) the retaining plate 25; (2) the insulator 30; (3) the outer layer of contact springs 22; (4) the outer insulating plate 31; (5) the outer lifting plate 27; (6) the spacer plate 29; (7) the middle insulating plate 32; (8) the inner layer of contact springs 22; (9) the inner insulating plate 31; and (10) the inner lifting plate 28.

The fixed contacts consist of eight bare wire conductors 50 made of bronze or the like, mounted in two levels along the front edge of the contact panel, for engagement by the two levels of movable contacts, as illustrated in Figs. 2, 7 and 9. These eight conductors, which may be considered as representing two 4-wire trunks, are threaded into openings 52 in eleven insulator blocks 51, located along the front edge of the panel. These blocks, one of which is separately shown in Fig. 12, are mounted on the panel by means of an extension 54 of smaller cross section, which fits into a narrow slot not shown, in the panel. They are secured in place by a spring key 55 (Figs. 13, 14) which is inserted in an opening 56 in the extension 54 following the insertion of the latter into the slot in the panel. The tension of the part 55 against the right face of the panel holds the block firmly in place.

The fixed contacts are pre-formed in the shape of an L, and the short leg of the L is covered with an insulating sleeve 57 and brought out at the back of the switch to provide terminals. The long end of the L is inserted in the blocks 51 in such a direction that the four terminal ends representing one trunk are brought out at one end of the switch, while the four ends representing the other trunk are brought out at the other end of the switch, in order to facilitate cross-multipling. These terminal ends are held in place at each end of the switch by clamps such as indicated at 58 in Fig. 2.

The select fingers 65, and the selection control member 75 are mounted on the opposite side of the contact panel, in the manner indicated in Figs. 7 and 8. The selection control member 75, which controls the pivoting of the select fingers, and is separately shown in Fig. 15, is a narrow ribbon of stainless steel or the like, with ten pairs of evenly spaced rectangular openings 76 along its length, and a mounting slot 77 at each end. In assembling this ribbon on the switch, the slot at one end is first slipped over a rivet head 78 on the end of an armature 81 on one of the end electromagnets 4 or 5. Both armature tips are then pressed towards each other until the other slot 77 can be slipped over the other rivet head 78. Upon release of the armatures, these will be restored to their normal position by the restoring springs 83, and will pull the ribbon tight.

The select fingers 65, best seen in Figs. 8, 9, 10, 22, are blanked from aluminum sheet, in the form shown in Fig. 10, with an enlarged section in the center portion, and another enlarged section at the rear end, in which is placed a pivot hole 66. Just forward of the hole 66 is a rivet 69, which clamps the loop end of a twin-limbed straight wire spring 67, shown separately in Fig. 11, against the outer face of the finger. The free ends of this spring, which are turned under at right angles, are spread apart to embrace the sides of the enlarged center section of the finger with a light but positive inward tension.

The select fingers 65 are mounted outside of the control ribbon 75, in the following manner. The pivot hole of each select finger is slipped over one of a row of embossments formed in the rear step 18 of the contact panel (Fig. 9), with the bent-back tips of the wire spring 67 pointing towards the contact panel. These spring ends are then inserted into the nearest pair of openings 76 in the control ribbon, where they rest against the inner sides of the two openings. Since the spaces between the pairs of openings are in transverse alignment with the corresponding embossments, the select fingers are thereby held in parallel alignment with one another, across the panel, with the free ends adjacent the front edge of the panel, midway between the various pairs of working tips 38 on the inner lifting plates 28 (Figs. 7, 8).

Figure 22:
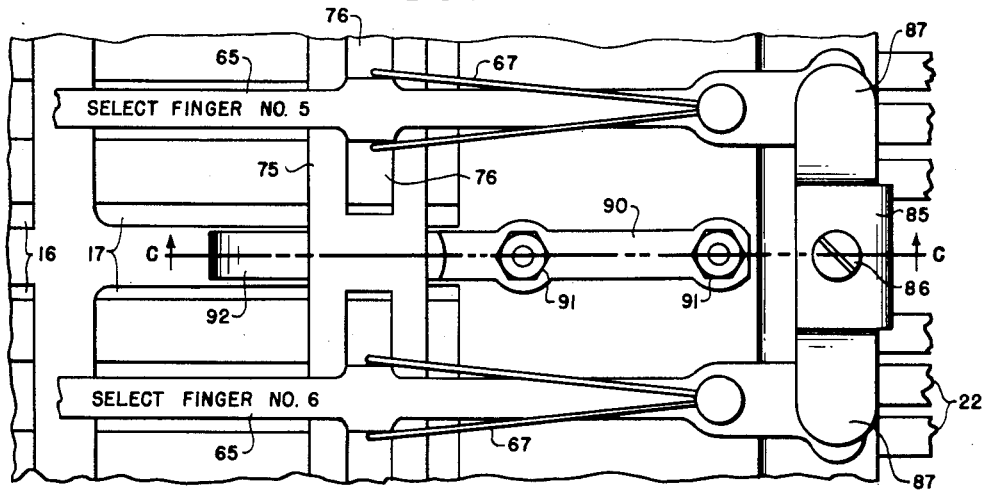
Fig. 22 is an enlarged view, on the scale of Fig. 9, of a portion of the equipment broken away in Fig. 8.
Figure 24:
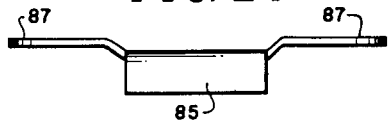
Fig. 24 is a rear end view of the select finger retaining plate shown at the right in Fig. 22, drawn on the same scale.

The pivot ends of the select fingers 65 are prevented from slipping off the embossments on the contact panel by means of dished clamp plates 85, each of which serves to hold two select fingers, as is clear from Figs. 8 and 22. The depressed central section is secured to a tapped hole in the panel 15 by a screw 86, while the raised side wings 87 (Figs. 22, 24) overlie the pivot ends of the select fingers at a height to allow the latter free movement, while preventing them from climbing off of their pivots.

The select magnets 4 and 5 which are identical except for being reversed in construction, are a standard form of electromagnet, rather long and narrow in shape having a coil 79 mounted on an extension of the soft iron contact panel by a screw 89, and an armature 80 mounted on another extension of the panel, which thus serves as a heel-piece. A short armature arm 82 (Fig. 2) on one side of the armature, is arranged to operate a set of contact springs 88 which may vary in number, while a long armature arm 81 (Fig. 8) on the other side of the armature, is arranged to move the control ribbon 75 up or down. Coil terminals 90 provide a means for operating the electromagnet.

If therefore, select magnet 4 is operated, its armature arm 81 will pull the control ribbon 75 upwards. The control ribbon in turn, will cause armature arm 81 on the lower select magnet 5 to rotate anti-clockwise, against the tension of its restoring spring 83. And when select magnet 4 is de-energized, the lower spring 83 pulls the ribbon 75 and the two armature arms 81, back to their normal position. This restoring movement is stopped when the lower leaf spring 83 strikes against the lower backstop 84, which is an adjustable finger extending from the contact panel. Contrariwise, operation of the lower select magnet 5 will pull the control ribbon 75 downwards. This will cause the upper armature arm 81 to pivot clockwise, against the tension of its restoring spring 83, which returns the control ribbon and both armatures to their normal position again following the subsequent de-energization of select magnet 5.

Because of the linkages effected between the control ribbon 75 and the select fingers 65 by the wire springs 67, it will be apparent that the select fingers will follow the movements of the control ribbon and be pivoted away from their vertical-normal position to an upward or a downward off-normal position accordingly. Thus, for an upward movement of the control ribbon, each select finger will move from the open space between the associated pair of formed tips 38 of the inner lift plate 28, and will align itself with the upper formed tip of the pair. And upon a downward movement of the tape, each select finger will align itself with the lower formed tip 38 of the associated pair. Upon release of the control ribbon to normal, it moves the select fingers likewise to their vertical-normal position. Because of the construction and lightness of the select fingers and other moving parts of this sub-asesmbly, the select fingers do not whip or vibrate upon restoration to their normal position, as is the tendency with some other forms of select fingers.

Figure 23:
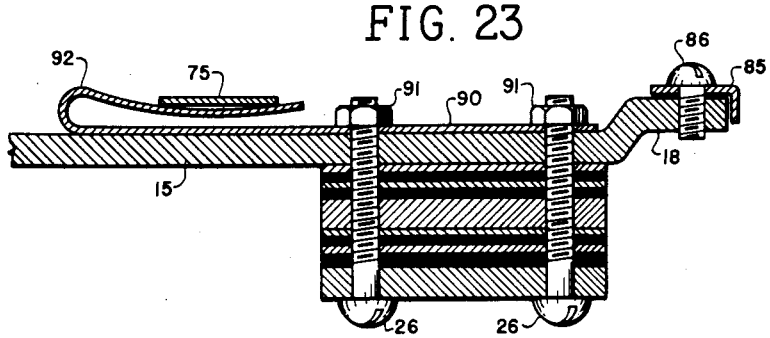
Fig. 23 is a cross-sectional view of Fig. 22, taken along the line C—C.

Underneath the select ribbon, between the fifth and sixth select fingers, in the exact center of the contact unit in the section omitted from the assembly drawings, is a leaf spring 90, shown only in Figs. 22 and 23. A flat rear portion on this spring is secured to the body of the contact panel by two nuts 91 turned down over the protruding tips of two of the screws 26, while a curved-back front portion 92 lies along one of the transverse ribs separating two of the openings 17 in the panel 15. This section is turned back under the control ribbon 75 for which it forms a resilient support which aids in maintaining the control ribbon and the select fingers at the proper horizontal distance from the panel.

The operating member or hold bar 6, shown mounted in Fig. 1 and separately in Figs. 3, 4 and 5, is a short narrow ladder-like structure of aluminum or the like, with five U-shaped rungs 13. The side members of the ladder are provided with extensions 20 of reduced cross-section at each end for mounting purposes, while the rung 13 at one end of the device is provided with an upturned extension 14 which serves to transmit movement to the hold bar.

For mounting the hold bars 6 on the frame, a row of split leaf springs 44 (Fig. 6) are mounted along the front edge of the side plates 1 and 2 (Fig. 1) by means of a common retaining plate 48 on each side. Each hold bar is then suspended between two of these springs 44, with the rungs projecting rearward between the contact panels, by inserting the extensions 20 into corresponding slots 46 cut in the leaf springs. In this position, each rung 13 of each hold bar is located opposite a corresponding select finger 65, so that any leftward movement of a hold bar will cause the five select fingers in the same horizontal or transverse row to move in the same direction. In this position also the extension 14 on the end rung should be at the right, as shown in Fig. 1, where it will lie opposite an opening 47 in the leaf spring 44 thereat, and a corresponding hole not shown, in the side wall 2. It will be apparent that, like so many of the other parts, these leaf springs may be punched out as a single strip, if desired, for maximum convenience of assembly. In the drawings, these parts are shown as "doubles" only to conserve space.

The hold magnets 7, mounted on the outside of the side wall 2, are light duty electromagnets similar to select magnets 4 and 5, but having their own heelpieces, not visible in the drawings. Like the select magnets, they may also be provided with contact springs, although none are indicated in the drawing. Each hold magnet is provided with an armature 60 having an extension 61, which is arranged to project through the corresponding opening in the side wall 2 and the opening 47 in the associated leaf spring 44 to engage the extension 14 of the associated hold bar.

It is now apparent that the operation of any hold magnet 7 will cause the armature extension 61 to press against the extension 14 on the associated hold bar 6, which will accordingly be moved to the left. The associated mounting springs 44, which are adjusted with inward tension, with the stronger tension given to the springs on the left plate 1, follow this movement. And upon release of the hold magnet these springs will move the hold bar to the right, back to its normal position. It will also be apparent that since the hold bars are held in place only by spring tension, any or all of them may be removed, easily and quickly, without tools of any kind, by simply spreading the two associated leaf springs 44 apart with the fingers. The hold bar extensions 20 will thereupon slip readily out of the slots 46, and the hold bar can be lifted out in one motion. This provides complete visibility and direct access to the contact units from the front. Actually, the hold bars, due to their open construction, interfere but little with visibility, as is clear from Fig. 1. It is also clear from Fig. 1 that the rungs 13 of the hold bars occupy only a small amount of space between the contact units. This would allow the lateral spacing of these units to be considerably less than shown, without crowding.

Upon the operation of any hold bar to the left, the rungs 13 thereof will move the forward end of the five select fingers 65 in the corresponding horizontal row also to the left. If all five of these select fingers are in their central normal position as in Fig. 1, their working tips will be moved leftward between the two tips 38 on the corresponding inner lift plates 28, and no contact springs on any of the five panels will be affected. The corresponding section of the control ribbon will also be moved to the left by the select finger, but to a lesser extent, since it is located much further to the rear, where the transverse movement of the select finger is necessarily much less than at the front end. Upon return of the hold bar to its normal unoperated position, the spring 90 (Fig. 22) aids the select ribbon, whose thinness makes it quite flexible, to return the deflected select fingers to their horizontal-normal position.

If however one of the upper select magnets 4 has previously operated to pull its ten select fingers to their upper vertical-off-normal position, the leftward movement of a hold bar will press the tip of the off-normal select finger of the corresponding horizontal row against the upper extension 38 of the associated pair of tongues 37 on the inner lift plate 28. This upper one of the lift plate tongues 37 will accordingly be moved to the left against the associated tongue 41 of the inner insulating plate 31, which will move the two shorter upper contact springs 22 of the inner row against the corresponding inner bare-wire fixed contacts 50. The two springs 22 at the same time move an upper tongue 43 of the middle insulating plate 32, which presses against a loop 35 of an upper tongue 34 of the outer lift plate 27, which moves an upper tongue 41 of the outer insulating plate 31. The latter tongue 41 in turn, moves the two shorter upper contact springs 22 of the outer row of springs in the group against the corresponding outer bare-wire fixed contacts 50.

In similar manner, if one of the lower select magnets 5 has previously operated to pull the associated ten select fingers to their lower vertical-off-normal position, the leftward movement of a hold bar will move the off-normal select finger of the corresponding horizontal row against the lower extension 38 of the associated pair of inner lift plate tongues 37. The lower ones of the associated pairs of tongues 41, 34 and 43 will thereupon, by a like chain reaction, move the four longer lower spring contacts 22 against the corresponding inner and outer bare-wire fixed contacts 50. These would be the four lower contacts in Fig. 9 for example, while the sub-group covered by the preceding paragraph would be the upper four.

Assuming an upward movement of the select fingers, followed by the operation of a hold bar: upon release of the operated select magnet 4, the selection control ribbon 75 is lowered to its normal position by the select magnet restoring springs 83, in the manner previously described. The associated select fingers 65 are accordingly pulled down to their vertical-normal position, by the holding power of their link springs 67, with the exception of the select finger held by the operated hold bar. The latter remains in its upper off-normal position, with the lower arm of its link spring 67 pulled away from it by the upper edge of the associated lower opening 76 in the control ribbon, which is now below the lower edge of the central enlarged portion of the held select finger. This link spring 67 of course, resists the return of the control ribbon to normal, but its relatively weak power is ineffective against that of the heavier springs 83.

Upon the eventual release of the hold magnet, the leaf springs 44 move the operated hold bar rightward to its original position. This frees the held select finger, which is urged by the control ribbon 75 and the left spring 90 of Figs. 22, 23 to follow the hold bar to its horizontal-normal position. At the same time the extended lower arm of the associated link spring 67 pulls the select finger down to its vertical-normal position midway between the two extensions 38. This movement stops cleanly when the upper arm of the link spring strikes the lower edge of the upper opening 76 in the control ribbon. Due to the lightness and the form of the select finger, and the fact that the tension of the two arms of the link spring is now equal, there is no bouncing or vibration of the select finger, as it resumes its vertical-normal position. The release of the select finger of course, also causes the disengagement of the operated contacts.

Assuming now a downward movement of the select fingers, followed by the operation of a hold bar: upon release of the operated select magnet 5, the control ribbon 75 is lifted back up to its normal position by the select magnet springs 83. The associated select fingers 65 are thereby lifted back to their vertical-normal positions, with the exception of the held select finger. The latter remains in its lower off-normal position, held by the pressure of the operated hold bar, with the upper arm of its link spring 67 pulled away from it by the lower edge of the associated upper opening 76 in the control ribbon, which is now above the upper edge of the enlarged central section of the select finger.

Upon the subsequent release of the operated hold magnet 7, the operated hold bar 6 frees the held select finger, which is returned to its horizontal and vertical normal positions in the same manner already described for the reverse movement, by the action of the springs 90 and 67. The operated lower sub-group of contacts are disengaged at the same time.

A further study of Fig. 9 will show that with this construction, all adjustments of the contacts, either before or after assembly, should be unnecessary. The location and spacing of the bare wire conductors 50 are predetermined, with relation to the panel 15, by the mounting block 51. The spacing between the inner layer of contact springs 22 and the inner layer of fixed contacts 50 is determined by the step 19 of the panel 15, upon which the inner insulator plate 31 rests. Similarly, the spacing between the outer layer of contact springs 22 and the outer layer of fixed contacts 50 is determined by the step 19 and the outer lift plate 27, of which the extensions 35 determine the spacing between the two levels of contact springs 22. It will also be apparent that the height of the step 19 is such that the forward end of the contact springs 22 is higher than the rear end. The very act of assembly thus stores back-tension in these springs and fixes their spacing automatically.

An alternative arrangement for the contact spring assembly of Fig. 9, wherein slight modifications are made in some of the parts, is illustrated in Figs. 25 to 33. With this arrangement, all four springs 22 of either level of a group may be operated, dependent on the direction of the preliminary selective movement, instead of two springs in each level, as with Fig. 9.

To accomplish this result it is necessary, first of all, to replace the insulating plates 31 and 32 of Fig. 9 (Figs. 21 and 18) with insulating plates 131 and 132 of Figs. 33 and 32. The only difference between these parts is that the tongues 141 and 143 of Figs. 33 and 32 are double the width of the tongues 41 and 43 of Figs. 21 and 18, so as to underlie all four contact springs 22 of the associated level, in the corresponding contact group.

The second change required is the substitution of the double inner lift plate 128 of Figs. 30 and 31 for the double inner lift plate 28 of Figs. 19 and 20. Here again, the only change is the use of two wide tongues 137 instead of the four tongues 37 of Fig. 19, and the replacement of the four right angled extensions 38 by the two extensions 138 of Figs. 30 and 31.

The third change required is the substitution of the two single outer lift plates 120 and 127 of Figs. 26 to 29 for the double outer lift plate 27 of Figs. 16 and 17. Here again of course, the lifting tongues 124 and 134 are the width of four springs 22, rather than only two as in Fig. 16. Furthermore, the curled tips 35 at the ends of the tongues 34 of Fig. 16 have been replaced by two formed extensions 125, 126 and 135, 136 at the side of the lower ends of the respective tongues 124 and 134 of Figs. 26 and 28. In assembling this part into the pileup, the longer inward turned extension 136 or 126 is passed through the opening 16 in the panel, between the end inner spring and the side of the opening, where the necessary clearance is provided. To facilitate this operation, the tongues 137 of the inner lift plates may be lifted slightly if necessary, either by hand, or by means of an assembly fixture. When in position, as in Fig. 25, the lower, inward-turned extensions 136, 126 will be opposed to, and aligned with, the respective extensions 138 of the inner lift plate 128, while the outward-turned step of the shorter extensions 135, 125 will rest on the adjacent transverse rib of the panel 15, between the openings 16, on the contact side of the panel.

It is thus seen that the extensions 135, 125 serve to fix the spacing of the outer row of contact springs 22 with respect to the panel 15 and the outer layer of fixed contacts, while the extensions 136, 126 serve to transmit the transverse motion of the associated select finger to the corresponding outer lift plate. In other words, a movement of a select finger 65 towards the panel, following a select movement to the side of the extensions 136 will cause the corresponding inner lift plate tongue 137 to operate the four contact springs of the inner level of the associated contact group, while such action following a select movement to the side of an extension 136 or 126 will cause the corresponding outer lift plate tongue 134 or 124 to operate the four contact springs of the outer level of the associated contact group.

The principal advantage of this construction is that it places the respective line contacts 22 in direct horizontal alignment, so as to permit the use of a bare wire horizontal multiple between the contacts, where such multipling is desired. The low labor cost of this form of multipling is obvious, when it is considered that the bare wires would only need to be laid in narrow slots punched out of the terminal ends of the springs, and quickly soldered in place.

The principal disadvantage of this construction, with respect to that of Fig. 9, is that it requires the use of a more complicated outer lift plate, which would need to be blanked and formed and assembled as ten separate parts, rather than five, or one. It is likely therefore, that where the switch is to be used as a 100 line connector switch, for example, with no multipling between the springs 22, the construction of Fig. 9 would be preferable. On the other hand, where it is desired to use the switch as a lineswitch, with cross-multipling as required, between the springs 22, the convenience of the construction of Fig. 25 will be obvious. The saving in wiring time should more than offset the foregoing disadvantage.

Where expressions such as "upper," "lower," "left," "right," or "horizontal" and "vertical" have been employed in the foregoing description, they are intended to be taken with reference to the position of the switch as illustrated in Figs. 1, 2, 7 and 8. They are employed for convenience, and should not be construed as limiting the position of the switch in practice. Actually the switch will operate equally well in any position, since none of its operations are in any way dependent on gravity.

It should be understood that various modifications may be made in the different parts and arrangements herein disclosed without departing from the true spirit and scope of the invention defined in the following claims.

What is claimed is:

1. A unitary structure for a crossbar switch comprising a fixed mounting panel, a plurality of groups of contact members mounted on said panel in a plurality of rows respectively parallel with and perpendicular to the plane of said panel, contact actuating members mounted on said panel, a contact selecting member for each said contact group pivotally mounted on said panel, a select magnet mounted on each end of said panel, armatures for said magnets, a selection control member interconnecting said armatures and said selecting members so as to cause operation of either magnet to pivot said selecting members alternatively towards one of said magnets in a primary movement, and means whereby a secondary transverse movement of one of said positioned selecting members by an external operating member will cause said actuating members to actuate either one of two sub-groups of contact members in the associated group, dependent on the direction of said primary movement.

2. A crossbar structure as in claim 1 in which each one of said members of said structure lies in a plane parallel with said mounting panel, to reduce the overall thickness and cross-sectional area of said unitary structure to minimal values.

3. In a unitary structure for a crossbar switch, a mounting plate, a plurality of groups of movable contact members mounted on said plate in a plurality of rows parallel with said plate and the members of said parallel rows also arranged in a plurality of rows perpendicular to said plate, contact actuating members mounted on said plate, a contact selecting member for each group pivotally mounted on said plate, a select magnet mounted on each end of said plate, a selection control member movable longitudinally between said magnets in alternative directions responsive to the respective operations of said magnets, spring members linking said selecting members individually to said control member for causing said magnet operations to pivot said selecting members alternatively toward one of said magnets from an ineffective normal position to one of two active positions, means responsive to a subsequent movement of one of said selecting members toward said plate for causing said actuating members to actuate contact members in a plurality of said perpendicular rows in either of two sub-groups in the associated group subject to the direction of said first movement, and means for restoring the remaining ones of said selecting members to said ineffective normal position responsive to the release of said operated magnet.

4. A unitary crossbar structure as in claim 3, wherein all of the elements of said structure are mounted in planes parallel with said mounting plate, with said contact members, said actuating members and said selecting members all pointing in the same direction, and the free ends thereof terminating adjacent a common edge of said mounting plate to provide maximal visibility of essential operating clearances from the such edge.

5. A sub-assembly for a crossbar switch comprising a fixed mounting panel, a plurality of groups of contact members mounted on said panel in a plurality of rows parallel therewith, contact actuating members mounted on said panel in a plurality of rows parallel therewith, a contact selecting member for each group mounted on said panel in a single row parallel therewith, a selection control member interlinking said selecting members, means mounted on said panel for moving said control member lengthwise in either direction for pivoting said selecting members in a corresponding direction parallel with said panel, means for then moving one of said pivoted selecting members in a direction perpendicular to said panel, and means operated responsive to said last movement for causing said actuating members to actuate contact members in different ones of said parallel rows subject to the direction of said first movement of said selecting members, and in different ones of said groups subject to the location of said last movement.

6. A crossbar structure as in claim 5 wherein said contact members and said actuating members are mounted on one face of said mounting panel along one edge thereof in a common stackup, and said selecting members are mounted on the other face of said panel along said one edge thereof, with the actuable ends of said last three elements adjacent the opposite edge of said panel, and said selecting members normally positioned in ineffective normal positions between formed tips on the associated actuating members which project through openings in said panel.

7. In a crossbar switch structure, a mounting panel, a plurality of groups of contact members mounted on said panel in two rows parallel therewith, contact selecting members pivotally movable in a common plane parallel with said panel, each selecting member associated with a different contact group, a selection control member interlinking said selecting members for unitary movement, means for moving said control member in either of two directions for pivoting said selecting members in a corresponding direction parallel with said panel, means for causing a subsequent movement of one of said pivoted selecting members at right angles to the plane of said pivotal movement means operated responsive to such a subsequent movement following pivoting in one direction for actuating the contacts of only one of said parallel rows in the associated contact group, and means operated responsive to such a subsequent movement following pivoting in the other direction for actuating the contacts of the other of said rows in the associated contact group.

8. A crossbar sub-assembly as in claim 7, wherein the contact members of said parallel rows of contact members are arranged in a plurality of successive parallel rows at right angles to the plane of said mounting panel, with a plurality of said last named rows included in each group.

9. In a crossbar switch, a mounting panel, a plurality of groups of contact members mounted on one side of said panel in two rows parallel therewith, with corresponding members of each row also arranged in a plurality of rows perpendicular to said first rows, contact select members one for each contact group pivotally movable in a common plane parallel with said first rows, a selection control member interlinking said select members for unitary movement, means for moving said control member alternatively in opposite directions for pivoting said select members toward either end of said parallel rows in a preliminary selective movement, means for causing a subsequent actuating movement toward said panel by one of said pivoted select members, means operated responsive to such an actuating movement following pivoting in one direction for actuating the contacts in a plurality of said perpendicular rows in the associated contact group, and means operated responsive to such an actuating movement following pivoting in the other direction for actuating the contacts in a different plurality of said perpendicular rows in the associated contact group.

10. In a crossbar switch, a contact panel, a plurality of movable contacts on said panel in two rows parallel therewith, said contacts arranged in a plurality of adjacent groups, with the contacts of each group comprising a plurality of adjacent rows perpendicular to said panel, fixed contacts on said panel in two rows parallel therewith, contact actuating plates on said panel in two rows parallel therewith, a contact selecting finger opposite each contact group, means for pivoting said selecting fingers as a unit in alternative directions in a common plane parallel with said panel, means for then causing a movement of one of said fingers at right angles to said panel, means operated responsive to such right angled movement of said one finger following pivoting of said fingers in one direction for causing said actuating plates to move the movable contacts of one of said parallel rows in the associated contact group against corresponding ones of said fixed contacts, and means operated responsive to such right angled movement of said one finger following pivoting of said fingers in the opposite direction for causing said actuating plates to move the movable contacts of the other of said parallel rows in the associated contact group against other corresponding ones of said fixed contacts.

11. In a sub-assembly for a crossbar switch including contact members mounted in horizontal and vertical rows on one side of a common mounting panel in a plurality of groups and sub-groups, said rows respectively parallel with and perpendicular to the plane of said panel, a row of select members on the other side of said panel arranged for pivotal movement in a plane parallel with said panel opposite said contact groups, a control member on said other side of said panel, means for moving said control member lengthwise in either direction in a plane parallel with said panel, a double-ended straight wire spring mounted lengthwise on each said select member, and formed tips on said spring resiliently embracing the sides of said select member and the sides of openings in said control member to cause said select members to pivot correspondingly in response to said movements of said control member to select different ones of said sub-groups of contact members for operation.

12. In a crossbar sub-assembly as in claim 11 wherein said control member and said select members move from a normal ineffective position, means for operating one of said selected sub-groups of contacts responsive to actuation of one of said pivoted select members towards said panel, means to cause said last actuation, means for then restoring said control member to its normal position, said springs being thereupon effective to restore the unactuated select members to their normal position against the resistive tension of the spring on said actuated member, means for releasing said actuated member, and said spring thereon being thereupon effective to restore said member to its normal position.

13. In a crossbar switch, a mounting panel, a contact spring pileup having its contacts mounted in two levels on one side of said panel, said contacts arranged in a plurality of rows perpendicular to said panel, and said levels parallel with said panel, a pair of actuating plates mounted on said one side of said panel as a part of said pileup and respectively underlying said two levels of contacts, a pivotable select finger mounted on the other side of said panel, a selection control member resiliently connected to a point on said select finger, means for moving said control member in either of two directions in a plane parallel with said panel for pivoting said select finger in a corresponding direction, means for moving said pivoted select finger at right angles to said panel, and means operated responsive to said last movement for actuating either one of said actuating plates and the corresponding level of contacts subject to the direction of movement of said select member.

14. In a crossbar switch, select fingers individually pivoted on one side of a common mounting panel and rotatable as a unit in alternative directions in a common plane parallel to said panel to select corresponding sub-groups of contact springs for operation, a contact bank mounted on the other side of said panel in a common stackup comprising a plurality of movable contact springs arranged in a plurality of rows parallel with said panel with the springs of said parallel rows arranged in a plurality of rows perpendicular to said panel wherein said sub-groups include a plurality of said perpendicular rows, flexible actuating plates in said stackup underlying the contact springs of each sub-group for actuating the same responsive to a transverse movement perpendicular to said panel of one of said rotated select fingers, insulators in said stackup separating said contact springs and said actuating plates, and said actuating plates and said insulators constituting separate leafs projecting in a comb-like arrangement from a single piece of material common to a plurality of said sub-groups.

15. In a crossbar switch, a frame, contact panels mounted on end therein side by side in parallel vertical planes, with vertical edges facing to front and rear, contact sets on each panel, contact actuating members on each panel, contact select fingers on each panel, a finger control member on each panel, means on each panel for moving said control member vertically along such panel in either direction, means responsive to said movement for pivoting the associated select fingers in a corresponding direction to select corresponding ones of said contact sets for operation, operating members movable horizontally across the front edges of said panels opposite said select fingers, means operated responsive to such horizontal movement of one of said operating members for causing one of said pivoted select fingers and one of said actuating members to actuate one of said selected contact sets, side members on said frame, and means on said side members for controlling said horizontal movement.

16. In a crossbar switch as in claim 15, means for mounting said operating members on said side members independently of said contact panels, and means enabling mounting and demounting of said operating members from the front without tools, and without disturbing any other equipment.

17. In a crossbar switch as in claim 15 wherein said operating members are in the form of a ladder with U shaped rungs thereon for engaging said select fingers, a normal position for said operating members, magnets on said side members for causing said movement of said operating members, and leaf springs on said side members for holding said operating members in said normal position and for restoring said members to said normal position responsive to release of the associated magnet.

18. In a crossbar switch, a rectangular contact panel, top, bottom, front, and rear edges on said panel, a row of select fingers mounted on said panel on pivots located along the rear edge of said panel on one side thereof, a control ribbon, means connecting said select fingers to said control ribbon, normal positions in planes parallel with and perpendicular to said panel for said select fingers, means for displacing said control ribbon lengthwise toward said top and bottom edges to pivot said select fingers in alternative directions from said parallel normal position, groups of contact sets secured to the rear edge of said panel on the side opposite said select fingers and extending transversely across said panel toward the front edge thereof in planes parallel with said panel, two sub-groups of contacts in each group, an operate bar for each contact group, means for moving any operate bar transversely across the front edge of said panel at right angles thereto, extensions on said operate bars for actuating the associated pivoted select finger away from said perpendicular normal position, means operated responsive to said select finger actuation for operating either of the sub-groups of contacts in the associated contact group subject to said first movement, means for releasing said operate bar, and means enabling said control ribbon to restore said last moved select finger to both of its normal positions responsive to such release.

19. In a crossbar switch as in claim 18, openings in said control ribbon, double-ended wire springs mounted along each said select finger with the two ends of each spring resiliently connecting its finger to said ribbon via said openings, means for releasing said control ribbon, said springs on the unactuated select fingers thereupon effective to restore such select fingers to their parallel normal positions, and said spring on said actuated select finger effective responsive to the subsequent release of said operate bar for restoring such select finger to its normal parallel position.

20. In a crossbar switch a contact panel, select fingers on said panel movable in either of two directions to select sub-groups of contacts, and in a third direction for operating the selected contacts, an inner row of lift plates on said panel overlying the plane surface thereof, an inner row of contact springs on said panel overlying said lift plates, an outer row of lift plates on said panel overlying said contact springs, an outer row of contact springs on said panel overlying said outer lift plates, fixed contacts, means mounting said fixed contacts on said panel at fixed distances therefrom, free ends on said contact springs movable from a normal position to an operated position against said fixed contacts, means operated responsive to any said third movement of any said select finger for causing said lift plates to operate a plurality of said spring ends in each of said spring rows into engagement with said fixed contacts, said plurality being different for each alternative select movement, and means including said lift plates for jointly supporting said free ends of all of said contact springs on a common portion of said panel for fixing the said normal position of said spring ends with relation to said fixed contacts.

21. In a crossbar switch a contact panel, select fingers on said panel movable in either of two directions to select sub-groups of contacts for operation, and in a third direction to operate the selected contacts, an inner row of lift plates on said panel overlying the flat surface thereof, an inner row of contact springs on said panel overlying said lift plates, an outer row of lift plates on said panel overlying said contact springs, an outer row of contact springs on said panel overlying said outer lift plates, fixed contacts, means mounting said fixed contacts on said panel at fixed distances therefrom, free ends on said contact springs movable from a normal position, means operated responsive to any said third movement of any said select finger for causing said lift plates to move a plurality of said spring ends in alternative ones of said spring rows, dependent on the direction of said selective movement, into engagement with said fixed contacts, and means including said lift plates for supporting said free ends of said respective inner and outer rows of springs on separate portions of said panel for fixing the respective normal positions of said movable spring ends with relation to said fixed contacts.

References Cited in the file of this patent

UNITED STATES PATENTS

| | | |
|---|---|---|
| 2,021,329 | Reynolds | Nov. 19, 1935 |
| 2,327,730 | Mallina | Aug. 24, 1943 |
| 2,611,827 | Arthur | Sept. 23, 1952 |
| 2,729,706 | Vincent | Jan. 3, 1956 |
| 2,740,843 | Montchausse | Apr. 3, 1956 |
| 2,740,844 | Kruithof et al. | Apr. 3, 1956 |